(12) United States Patent
Dalal et al.

(10) Patent No.: US 8,924,524 B2
(45) Date of Patent: Dec. 30, 2014

(54) AUTOMATED NETWORK CONFIGURATION OF VIRTUAL MACHINES IN A VIRTUAL LAB DATA ENVIRONMENT

(75) Inventors: Anupam Dalal, Emerald Hills, CA (US); Min-Ken Lai, Redwood City, CA (US); Aastha Bhardwaj, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 1074 days.

(21) Appl. No.: 12/510,072

(22) Filed: Jul. 27, 2009

(65) Prior Publication Data

US 2011/0022694 A1    Jan. 27, 2011

(51) Int. Cl.
*G06F 15/16* (2006.01)
*G06F 15/177* (2006.01)
*H04L 12/24* (2006.01)
*G06F 9/455* (2006.01)

(52) U.S. Cl.
CPC ........ *H04L 41/0843* (2013.01); *H04L 41/0856* (2013.01); *G06F 9/45558* (2013.01); *H04L 41/0873* (2013.01); *G06F 2009/45562* (2013.01); *G06F 2009/45595* (2013.01)
USPC ............ 709/222; 709/203; 709/226; 709/248

(58) Field of Classification Search
USPC ....................................................... 709/222
See application file for complete search history.

(56) References Cited

U.S. PATENT DOCUMENTS

| | | | |
|---|---|---|---|
| 6,151,324 A | 11/2000 | Belser et al. | |
| 6,765,921 B1 | 7/2004 | Stacey et al. | |
| 7,146,431 B2 | 12/2006 | Hipp et al. | |
| 7,203,944 B1 | 4/2007 | van Rietschote et al. | |
| 7,263,700 B1 | 8/2007 | Bacon et al. | |
| 7,339,929 B2 | 3/2008 | Zelig et al. | |
| 7,467,198 B2 | 12/2008 | Goodman et al. | |
| 7,554,995 B2 | 6/2009 | Short et al. | |
| 7,640,298 B2 | 12/2009 | Berg | |
| 7,660,324 B2 | 2/2010 | Oguchi et al. | |
| 7,716,667 B2 | 5/2010 | van Rietschote et al. | |
| 7,725,559 B2 | 5/2010 | Landis et al. | |
| 7,752,635 B2 | 7/2010 | Lewites | |
| 7,761,259 B1 * | 7/2010 | Seymour | 702/182 |

(Continued)

FOREIGN PATENT DOCUMENTS

JP         2004145684 A  *  5/2004
WO    WO 03058584 A2  *  7/2003
WO    WO 2008098147 A1  *  8/2008

*Primary Examiner* — Melvin H Pollack

(57) ABSTRACT

Methods, systems, and computer programs for creating virtual machines (VM) and associated networks in a virtual infrastructure are presented. The method defines virtual network templates in a database, where each virtual network template includes network specifications. A configuration of a virtual system is created, which includes VMs, virtual lab networks associated with virtual network templates, and connections from the VMs to the virtual lab networks. Further, the configuration is deployed in the virtual infrastructure resulting in a deployed configuration. The deployment of the configuration includes instantiating in the virtual infrastructure the VMs of the configuration, instantiating in the virtual infrastructure the virtual lab networks, retrieving information from the database, and creating and executing programming instructions for the VMs. The database information includes the network specifications from the virtual network templates associated with the virtual lab networks, and network resources for the virtual lab networks from a pool of available network resources. The programming instructions are created for the particular Guest Operating System (GOS) running in each VM based on the GOS and on the retrieved database information. When executed in the corresponding VM GOS, the programming instructions configure the VMs network interfaces with the corresponding network specifications.

23 Claims, 13 Drawing Sheets

(56) References Cited

U.S. PATENT DOCUMENTS

| | | | |
|---|---|---|---|
| 7,797,507 B2 * | 9/2010 | Tago | 711/203 |
| 7,814,228 B2 | 10/2010 | Caronni et al. | |
| 7,814,541 B1 * | 10/2010 | Manvi | 726/15 |
| 7,865,893 B1 | 1/2011 | Omelyanchuk et al. | |
| 7,865,908 B2 | 1/2011 | Garg et al. | |
| 7,941,812 B2 | 5/2011 | Sekar | |
| 7,958,506 B2 | 6/2011 | Mann | |
| 7,983,257 B2 | 7/2011 | Chavan et al. | |
| 7,984,108 B2 * | 7/2011 | Landis et al. | 709/215 |
| 7,987,432 B1 * | 7/2011 | Grechishkin et al. | 715/778 |
| 8,019,837 B2 * | 9/2011 | Kannan et al. | 709/220 |
| 8,036,127 B2 | 10/2011 | Droux et al. | |
| 8,051,180 B2 * | 11/2011 | Mazzaferri et al. | 709/227 |
| 8,054,832 B1 * | 11/2011 | Shukla et al. | 370/389 |
| 8,065,714 B2 * | 11/2011 | Budko et al. | 726/4 |
| 8,068,602 B1 * | 11/2011 | Bluman et al. | 379/266.1 |
| RE43,051 E | 12/2011 | Newman et al. | |
| 2005/0071446 A1 | 3/2005 | Graham et al. | |
| 2005/0182853 A1 | 8/2005 | Lewites et al. | |
| 2007/0050520 A1 | 3/2007 | Riley | |
| 2007/0195794 A1 | 8/2007 | Fujita et al. | |
| 2007/0234302 A1 * | 10/2007 | Suzuki et al. | 717/126 |
| 2007/0280243 A1 | 12/2007 | Wray et al. | |
| 2008/0028401 A1 | 1/2008 | Geisinger | |
| 2008/0043756 A1 | 2/2008 | Droux et al. | |
| 2008/0163207 A1 | 7/2008 | Reumann et al. | |
| 2008/0209415 A1 | 8/2008 | Van Riel et al. | |
| 2008/0215705 A1 * | 9/2008 | Liu et al. | 709/217 |
| 2008/0244579 A1 * | 10/2008 | Muller | 718/100 |
| 2009/0254990 A1 | 10/2009 | McGee | |
| 2010/0107162 A1 | 4/2010 | Edwards et al. | |
| 2010/0138830 A1 * | 6/2010 | Astete et al. | 718/1 |
| 2010/0169880 A1 | 7/2010 | Haviv et al. | |
| 2010/0180275 A1 | 7/2010 | Neogi et al. | |
| 2010/0191881 A1 * | 7/2010 | Tauter et al. | 710/104 |
| 2010/0235831 A1 * | 9/2010 | Dittmer | 718/1 |
| 2010/0257263 A1 | 10/2010 | Casado et al. | |
| 2010/0275199 A1 | 10/2010 | Smith et al. | |
| 2010/0281478 A1 * | 11/2010 | Sauls et al. | 718/1 |
| 2010/0306773 A1 | 12/2010 | Lee et al. | |
| 2010/0333189 A1 | 12/2010 | Droux et al. | |
| 2011/0022695 A1 | 1/2011 | Dalal | |
| 2011/0023031 A1 | 1/2011 | Bonola et al. | |
| 2011/0035494 A1 | 2/2011 | Pandey et al. | |
| 2011/0075664 A1 | 3/2011 | Lambeth | |

* cited by examiner

AUTOMATED NETWORK CONFIGURATION OF VIRTUAL MACHINES IN A VIRTUAL LAB DATA ENVIRONMENT

CROSS REFERENCE TO RELATED APPLICATIONS

This application is related to U.S. patent application Ser. No. 12/510,135 filed on the same day as the instant application and entitled "MANAGEMENT AND IMPLEMENTATION OF ENCLOSED LOCAL NETWORKS IN A VIRTUAL LAB", which is incorporated herein by reference.

DESCRIPTION OF THE RELATED ART

Virtualization of computer resources generally involves abstracting computer hardware, which essentially isolates operating systems and applications from underlying hardware. Hardware is therefore shared among multiple operating systems and applications wherein each operating system and its corresponding applications are isolated in corresponding VMs and wherein each VM is a complete execution environment. As a result, hardware can be more efficiently utilized.

Virtual labs, such as VMware's vCenter Lab Manager™ from the assignee of the present patent application, enable application development and test teams to create and deploy complex multi-tier system and network configurations on demand quickly. Testing engineers can set up, capture, and reset virtual machine configurations for demonstration environments in seconds. In addition, hands-on labs can be quickly configured and deployed, to be used for lab testing, hands-on training classes, etc.

While the deployment of virtual lab environments can be done in seconds, configuring the virtual lab environments is time consuming due to the need to specify the virtual machines and networks in the environment, and the need to configure the virtual machines, which includes network settings and other resources required by the virtual machines. In addition, when multiple environments are deployed at the same time, there can be resource conflicts such as the appearance of two VMs instantiated with the same Internet Protocol (IP) address.

SUMMARY

In one embodiment, the method defines virtual network templates in a database, where each virtual network template includes network specifications. In addition, the method creates a configuration of a virtual system which includes VMs, virtual lab networks associated with virtual network templates, and connections from the VMs to the virtual lab networks. Further, the configuration is deployed in the virtual infrastructure resulting in a deployed configuration. The deployment of the configuration includes instantiating in the virtual infrastructure the VMs of the configuration, instantiating in the virtual infrastructure the virtual lab networks, retrieving information from the database, and creating and executing programming instructions for the VMs. The database information includes the network specifications from the virtual network templates associated with the virtual lab networks and network resources for the virtual lab networks from a pool of available network resources. The programming instructions are created for the particular guest operating system (GOS) running in each VM based on the GOS and the retrieved database information. When executed in the corresponding VM GOS, the programming instructions configure the VMs network interfaces with the corresponding network specifications.

In another embodiment, a computer program embedded in a computer-readable storage medium, when executed by one or more processors, performs the method operations. In yet another embodiment, a system for creating VMs and associated networks in a virtual infrastructure includes a database and an application module. The database stores virtual network templates, configurations of virtual systems, virtual lab networks created, and a pool of available network resources for each of the virtual lab networks created. Each of the virtual network templates includes network specifications, and each of the configurations includes VMs, virtual lab networks associated with virtual network templates, and connections from the VMs to the virtual lab networks. The application module deploys a configuration resulting in a deployed configuration. The process of deployment includes the operations of instantiating in the virtual infrastructure the VMs of the configuration, instantiating in the virtual infrastructure the virtual lab networks of the configuration, retrieving information from the database, and creating and transmitting programming instructions for the VMs. The retrieved information from the database contains the network specifications from the virtual network templates associated with the virtual lab networks and information about network resources for the virtual lab networks from the pool of available network resources. The programming instructions are defined according to the GOS of each VM and the retrieved information from the database.

DETAILED DESCRIPTION

The following embodiments describe a method and apparatus for creating virtual machines (VM) and associated networks in a virtual infrastructure. It will be obvious, however, to one skilled in the art, that the present invention may be practiced without some or all of these specific details. In other instances, well known process operations have not been described in detail in order not to unnecessarily obscure the present invention.

Embodiments of the invention provide the ability to build and reuse arbitrary network topologies in a virtual laboratory environment including the ability to create and manage private and shared networks, connect virtual machines to networks, configure programmatically single and multi-homed guests, and manage Media Access Control (MAC) and Internet Protocol (IP) address reservation, among other features. A virtual lab module provides management capabilities for the virtual lab environments in order to simplify the process of creating and deploying the virtual lab environments. The virtual lab module automates the process of configuring the VMs in the virtual lab environments by programmatically creating scripts or programs that run in the Guest Operating System (GOS) of the VM to configure the network settings of the VM.

Figure 1:
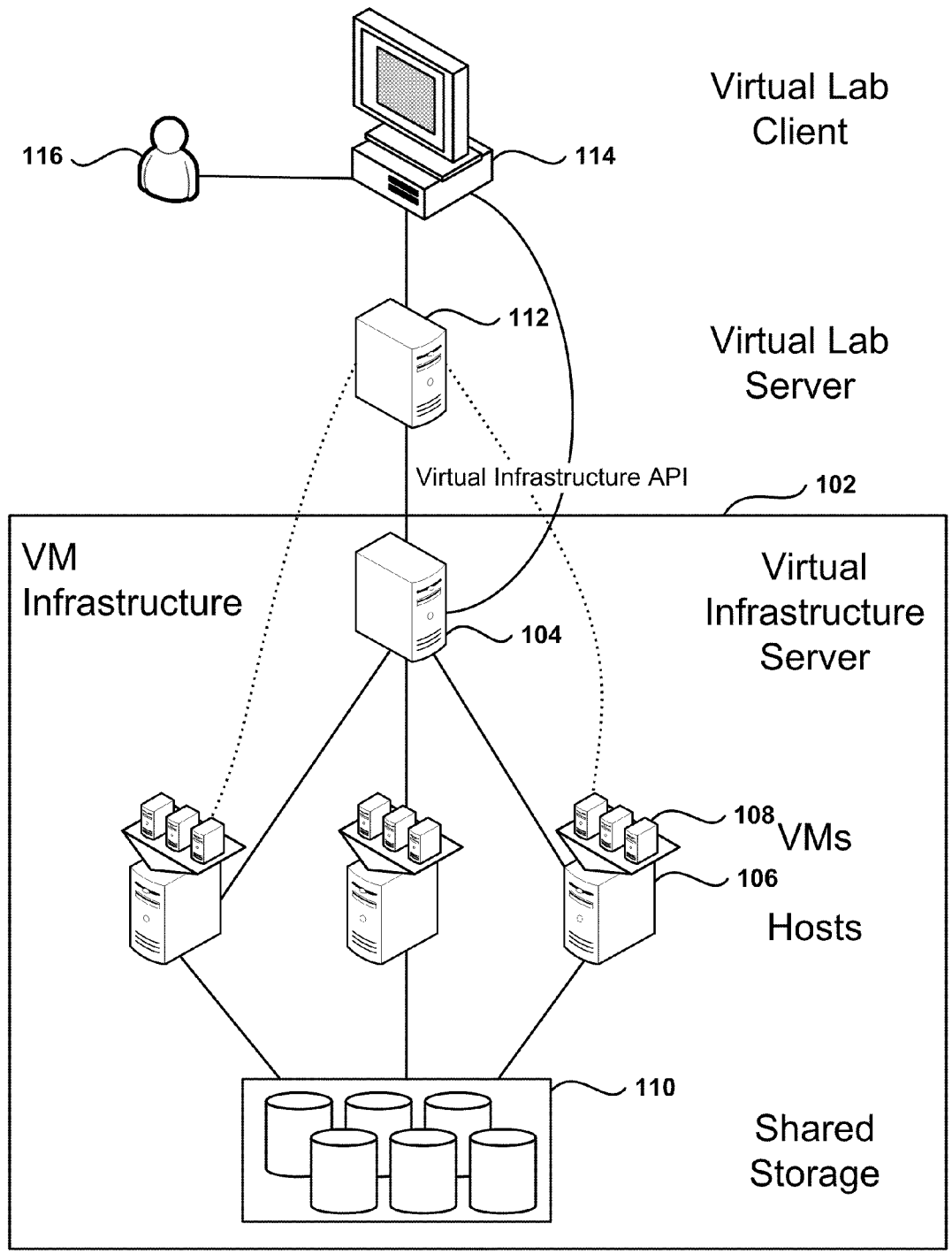
FIG. 1 includes an architectural diagram of an embodiment of a virtual infrastructure system.

FIG. 1 includes an architectural diagram of an embodiment of a virtual infrastructure system. Virtual infrastructure 102 includes one or more virtual infrastructure servers 104 that manage a plurality of hosts 106. Virtual machines 108 are instantiated in hosts 106, and the multiple hosts share a plurality of resources within the virtual infrastructure, such as shared storage 110. A configuration is a core element of a virtual lab and is composed of virtual machines and virtual lab networks. Virtual lab users can group, deploy, save, share, and monitor multi-machine configurations. Configurations reside in the library or in user workspaces, in which case they are referred to as workspace configurations.

Virtual lab networks can be categorized as private networks and shared networks. Private networks in a configuration are those networks available exclusively to VMs in the configuration, that is, only VMs in the configuration can have a Network Interface Controller (NIC) or Virtual NIC (VNIC) connected directly to a switch or virtual switch (VSwitch) for the private network. Access to data on a private network is restricted to members of the configuration, that is, the private network is isolated from other entities outside the configuration. In one embodiment, a private network in the configuration can be connected to a physical network to provide external connectivity to the VMs in the private network, as discussed in more detail below. Private networks in a configuration are also referred to herein as Configuration Local Networks (CLN) or virtual networks. Shared networks, also referred to herein as shared physical networks or physical networks, are available to all VMs in the virtual infrastructure, which means that a configuration including a shared network will enable VMs on the shared network to communicate with other VMs in the virtual infrastructure connected, directly or indirectly, to the shared network.

Deploying a configuration causes the VMs and networks in the configuration to be instantiated in the virtual infrastructure. Instantiating the VMs includes registering the VMs in the virtual infrastructure and powering-on the VMs. When an individual VM from a configuration is deployed, virtual lab deploys all shared networks and CLNs associated with the configuration using the network connectivity options in the configuration. If one network in the configuration already exists in the virtual infrastructure, the deployment will use the existing network. If the network does not exist, the deployment will request from the virtual infrastructure the instantiation of the network. In one embodiment, not all the VMs are instantiated because the user selects which VMs to be instantiated in the virtual infrastructure. Deploying the configuration also includes connecting NICs of the VMs to the virtual lab networks. Undeploying a configuration de-instantiates the VMs in the configuration from the virtual infrastructure. De-instantiating VMs includes powering off or suspending the VMs and un-registering the VMs from the virtual infrastructure. The state of the deployment can be saved in storage or discarded. Saving the memory state helps debugging memory-specific issues and makes VMs in the configuration ready for deployment and use almost instantly.

Virtual lab server 112 manages and deploys virtual machine configurations in a collection of hosts 106. It should be appreciated that not all hosts 106 need to be part of the scope of virtual lab server 112, although in one embodiment, all the hosts are within the scope of virtual lab server 112. Virtual lab server 112 manages hosts 106 by communicating with virtual infrastructure server 104, and by using virtual lab server agents installed on those hosts. In one embodiment, virtual lab server 112 communicates with virtual infrastructure server 104 via an Application Programming Interface (API), for example, to request the instantiation of VMs and networks.

Although virtual lab server 112 is used to perform some management tasks on hosts 106, the continuous presence of virtual lab server 112 is not required for the normal operation of deployed VMs, which can continue to run even if virtual lab server 112 becomes unreachable, for example because a network failure. One or more users 116 interface with virtual lab server 112 and virtual infrastructure 102 via a computer interface, which in one embodiment is performed via web browser.

Figure 2:
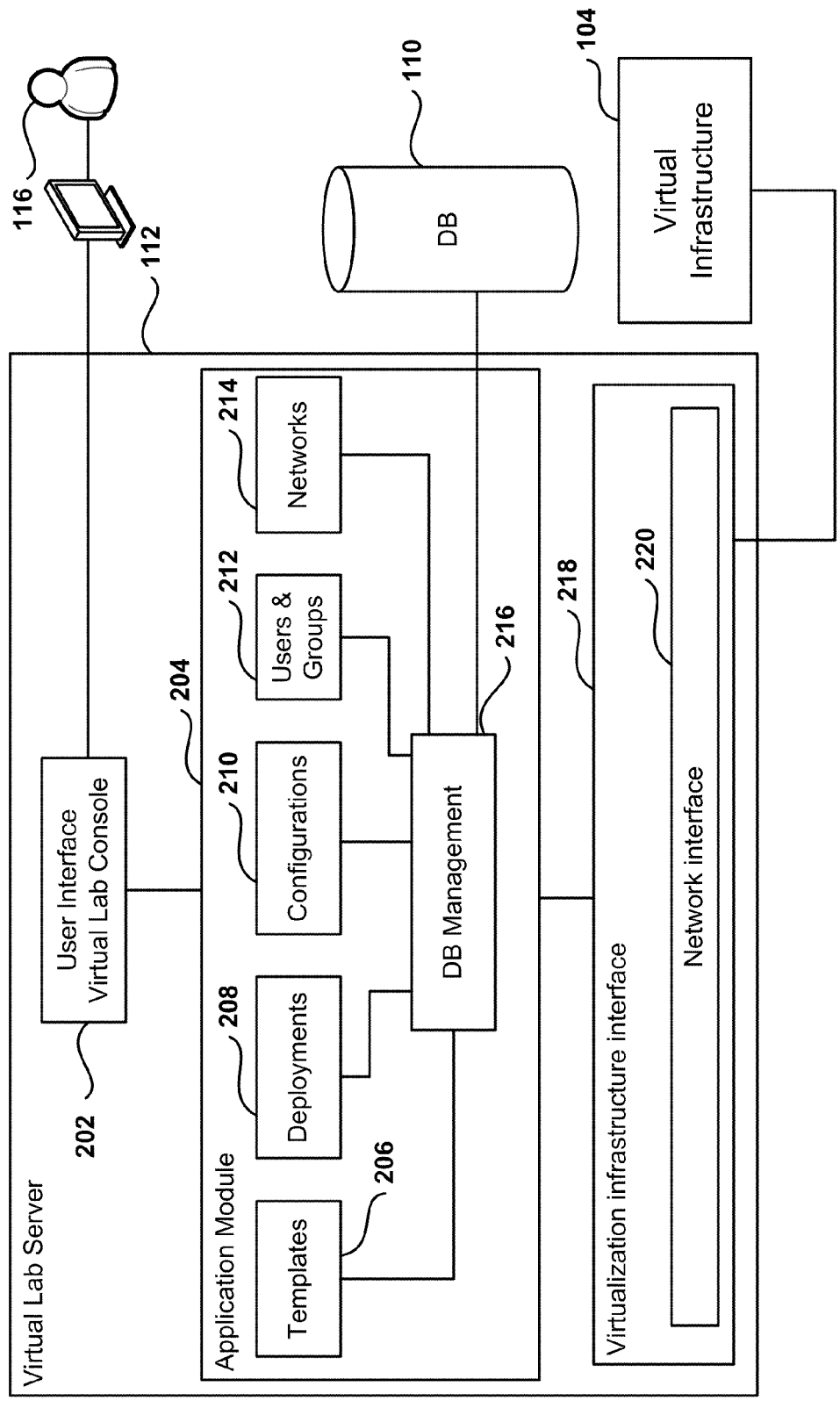
FIG. 2 illustrates the architecture of the virtual lab server in accordance with one or more embodiments.

FIG. 2 illustrates the architecture of virtual lab server 112 in accordance with one embodiment. User interface module 202 provides a virtual lab console for user 116 to perform different virtual lab operations, such as creating, copying, and cloning configurations, creating VMs, creating network templates, deploying, un-deploying and re-deploying configurations, sharing configurations and templates, creating terminal consoles for the VMs, etc. A network template contains the specification of a virtual lab network. One or more VNICs can be associated with a network template, and when the VM is deployed, virtual lab creates a virtual lab network based on the network template and connects the VNIC to that network. Network templates allow administrators and template creators to predefine the virtual networks available for other users. A network template provides control and consistency across the virtual lab installation and within an organization. Network templates can be shared with other users in an organization or across the entire virtual lab installation. A virtual machine template is a VM image loaded with an operating system, applications, and data. After a VM template is defined, users can quickly and easily create multiple VMs based on the VM template without having to reinstall software or redo setup tasks on each VM. Using VM templates ensures that VMs are consistently configured across an entire organization.

Application module 204 executes the core functionality of virtual lab server 112. Database manager 216 interfaces with database 110, residing in the virtual infrastructure shared storage, to store and retrieve the information used by virtual lab server 112. This information includes templates 206 (VMs and networks), virtual lab deployments 208, virtual lab configurations 210, virtual lab users and groups 212, and virtual lab networks 214. More details on the different elements in the database are described below in reference to FIG. 7. Virtualization infrastructure interface 218 in virtual lab server 112 sends and receives information to and from virtual infrastructure 104, such as for example to request that VMs be instantiated in the virtual infrastructure.

It should be appreciated that the embodiments illustrated in FIG. 2 are exemplary virtual lab modules, and other modules have been omitted for simplicity of description. Other embodiments may utilize different modules or configurations of modules. For example, in one embodiment the data structures are stored in a database not part of the virtual infrastructure pool of resources. The embodiments illustrated in FIG. 2 should therefore not be interpreted to be exclusive or limiting, but rather exemplary or illustrative.

Figure 3:
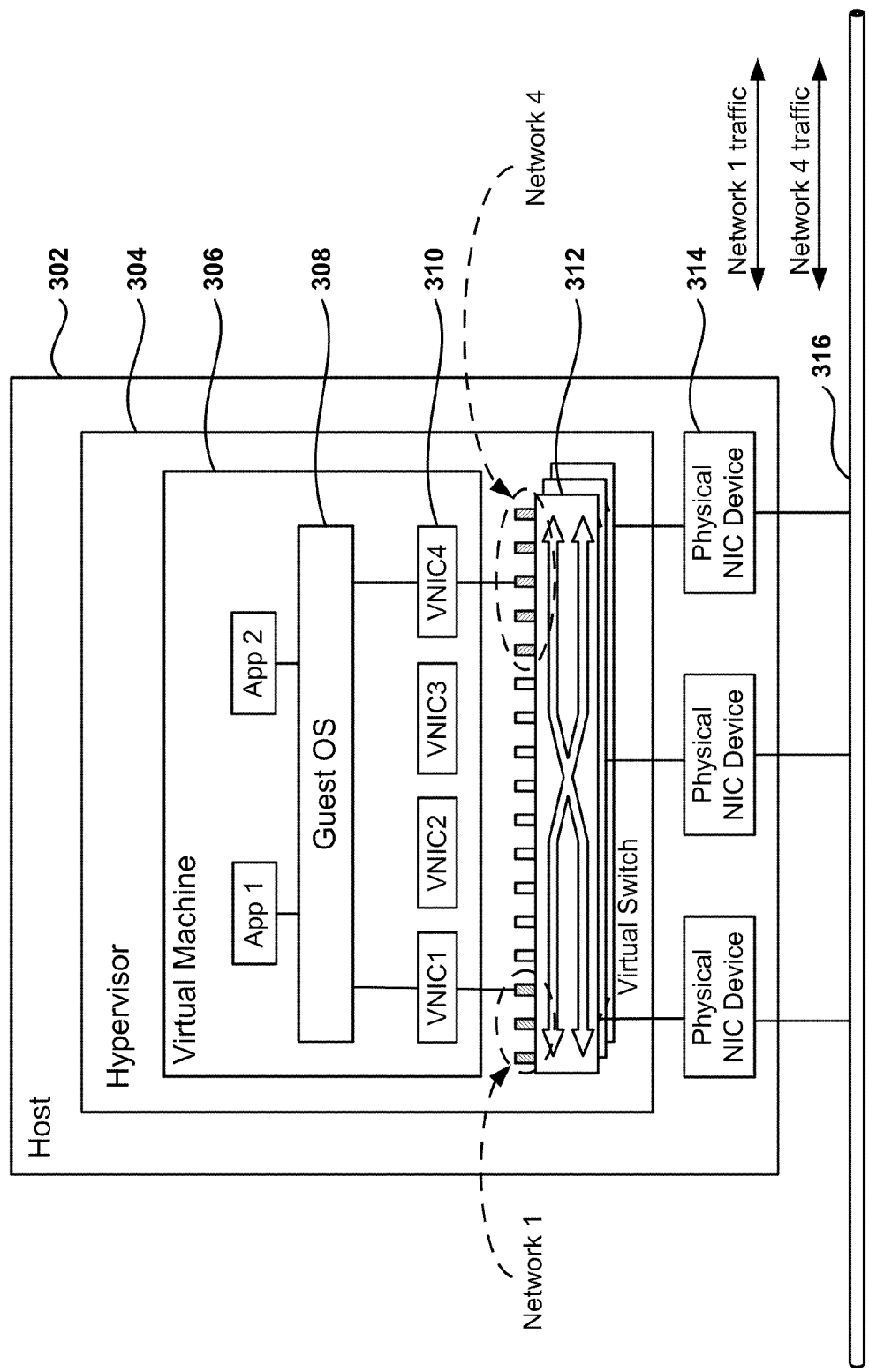
FIG. 3 depicts the host architecture for instantiating Virtual Machines (VM) with multiple Virtual Network Interface Cards (VNIC) in accordance with one or more embodiments.

FIG. 3 depicts one embodiment of the host 302 architecture for instantiating VMs 306 with multiple VNICs 310. Hypervisor 304, also referred to as virtual infrastructure layer, manages the assignment of VMs 306 in host 302 to remote users. VM 306 includes GOS 308 and multiple VNICs 310. Each VNIC 310 is connected to a virtual switch (VSwitch) 312 that provides network switch functionality for each of the network interfaces. Virtual switches 312 are connected to a physical NIC device in the host to connect to network 316. Each of the VNICs and VSwitches are independent, thus a VM can connect to several networks via several VNICs that connect to one or more physical NIC devices 314. In another embodiment, each VSwitch 312 is connected to a different physical NIC device, thus each VSwitch 312 provides connectivity for networks implemented on the corresponding network attached to the physical NIC device. For example, in the embodiment illustrated in FIG. 3, physical network 316 carries traffic for two different networks, Network 1 and Network 4. VSwitch 312 assigns a set of ports to Network 1 and a different set of ports to Network 4, where each set of ports supports MAC addressing for the corresponding network. Thus, packets with IP addresses from Network 1 coexist with packets with IP addresses from Network 4 on the same transmission media.

Figure 4:
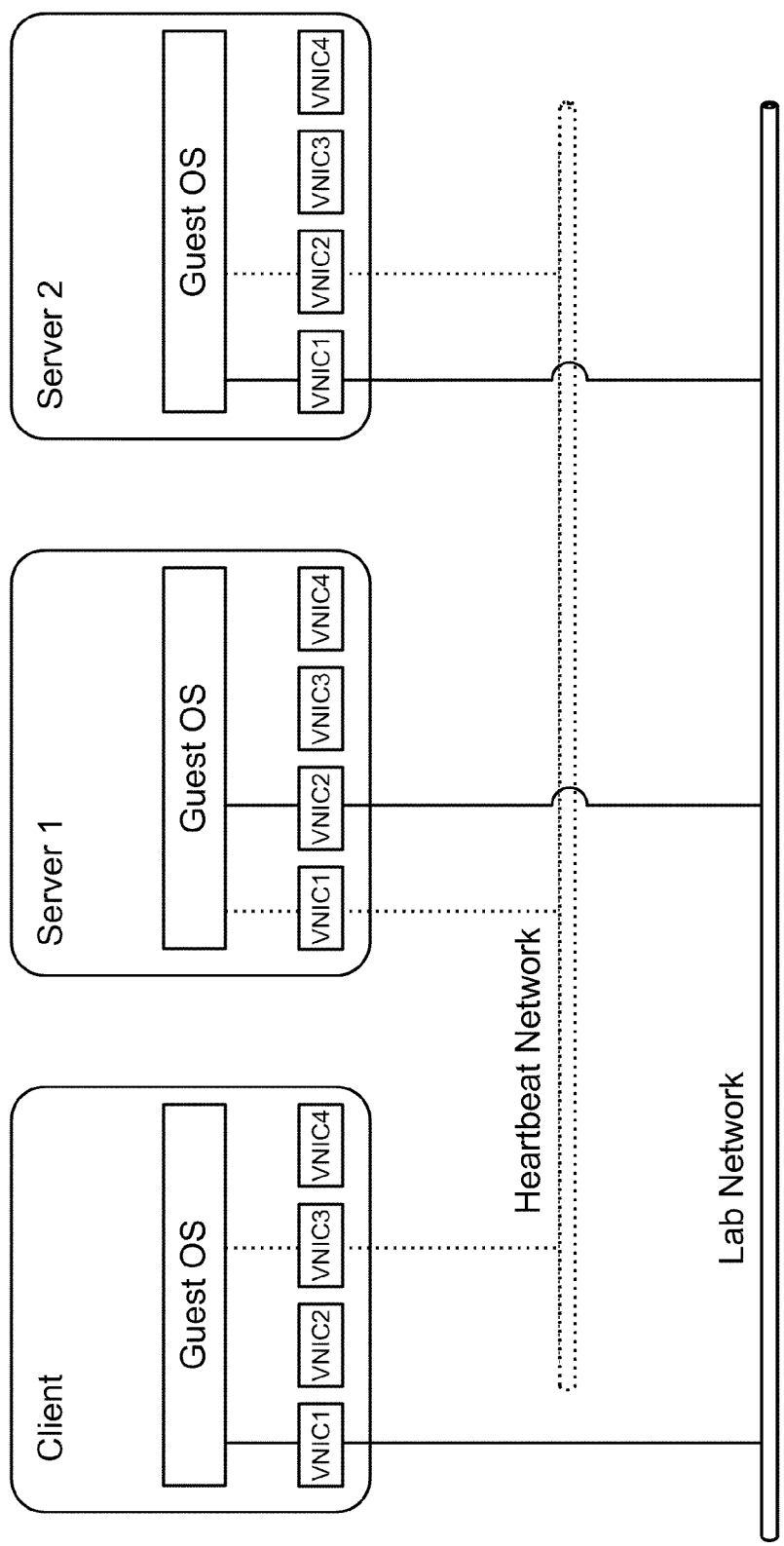
FIG. 4 illustrates a deployment of a configuration with VMs connected to two networks in accordance with one or more embodiments.

FIG. 4 illustrates a deployment of a configuration with VMs connected to two networks. FIG. 4 illustrates one of the advantages of having multiple VNICs in each VM, where Client, Server 1, and Server 2 VMs are connected to two different networks, the Heartbeat Network and the Lab Network. In one embodiment, the Lab Network is used for normal data transfers, while the Heartbeat Network is used to monitor the different VMs in order to detect a VM failure while providing an alternative communication path.

Figure 5:
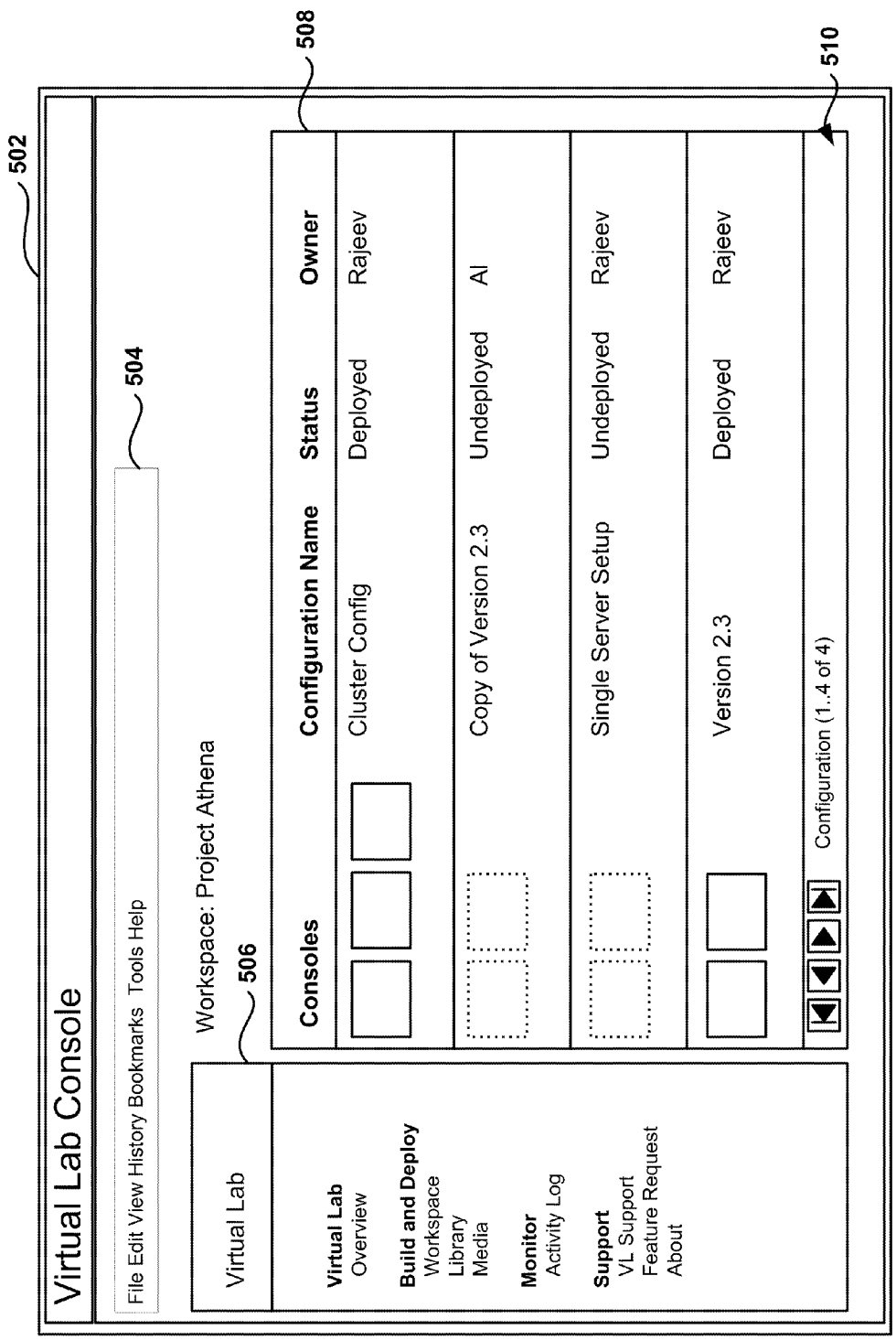
FIG. 5 shows a sample embodiment of a virtual lab interface in accordance with one or more embodiments.

FIG. 5 shows a sample embodiment of a virtual lab interface. In one embodiment, a remote user connects to virtual lab console 502 via Internet browser, but other Graphic User Interfaces (GUI) are also possible, as well as command line interfaces (CLI) and application programming interfaces (API). Menu 504 is used to select commands for execution by the virtual lab server. Virtual lab option field 506 provides additional functionality to the user, such as selecting viewing options and requesting execution of other virtual lab commands. FIG. 5 illustrates a screen capture of virtual lab console 502 at a moment in time. The virtual lab console displays list of configurations 508 available to the user. This list of configurations 508 includes four columns: Consoles for the iconic representation of deployed or undeployed configuration VM status, Configuration name, Status of the configuration, and Owner of the configuration. The status of the configuration can be deployed, being deployed, undeployed, etc. In another embodiment, other fields are available in list of configurations 508. A navigation bar 510 enables the user to scroll through the list of configurations.

When a user connects to the virtual lab, the user can add resource pools, virtual lab hosts, physical networks to use with virtual lab VMs, etc. Further, the user can add and synchronize media stores, create organizations, and add users and groups to those organizations. Users control their configurations and their VMs, and can share a saved configuration in the virtual lab library with other users. For example, if a testing engineer is working with a configuration and finds a bug, the engineer can save the deployment in the library to preserve its current state. The test engineer can then share the saved deployment with other engineers, such as a developer. The developer can then access and review the "live" configuration in the virtual lab.

When a user creates a configuration, the user specifies the contents of the configuration, such as the name of the configuration, a description, policy for fencing (fencing described below in reference to FIG. 6), member VMs, etc. When configuring each VM, the user specifies a VM template for the VM, the name for the VM, and the network information for the VM. The network information options are based on how the VM template has been defined. In one embodiment, the network information includes at least the specification of a primary NIC for VMs with multiple NICs. The primary NIC setting determines the default gateway for the virtual machine. In addition, configurations can be cloned to create new copies of the configuration, and configurations can be modified to incorporate all or some of the elements from another configuration. For example, virtual lab can copy the network environment in one configuration to another configuration, while allowing each of the configurations to have its own private pool of IP addresses when deployed, as discussed in more detail below.

It should be appreciated that the embodiments illustrated in FIG. 5 are exemplary user interfaces to enable a user to interact with the virtual lab application. Other embodiments may utilize different fields, or may arrange the fields in varying manners. The embodiments illustrated in FIG. 5 should therefore not be interpreted to be exclusive or limiting, but rather exemplary or illustrative.

Figure 6:
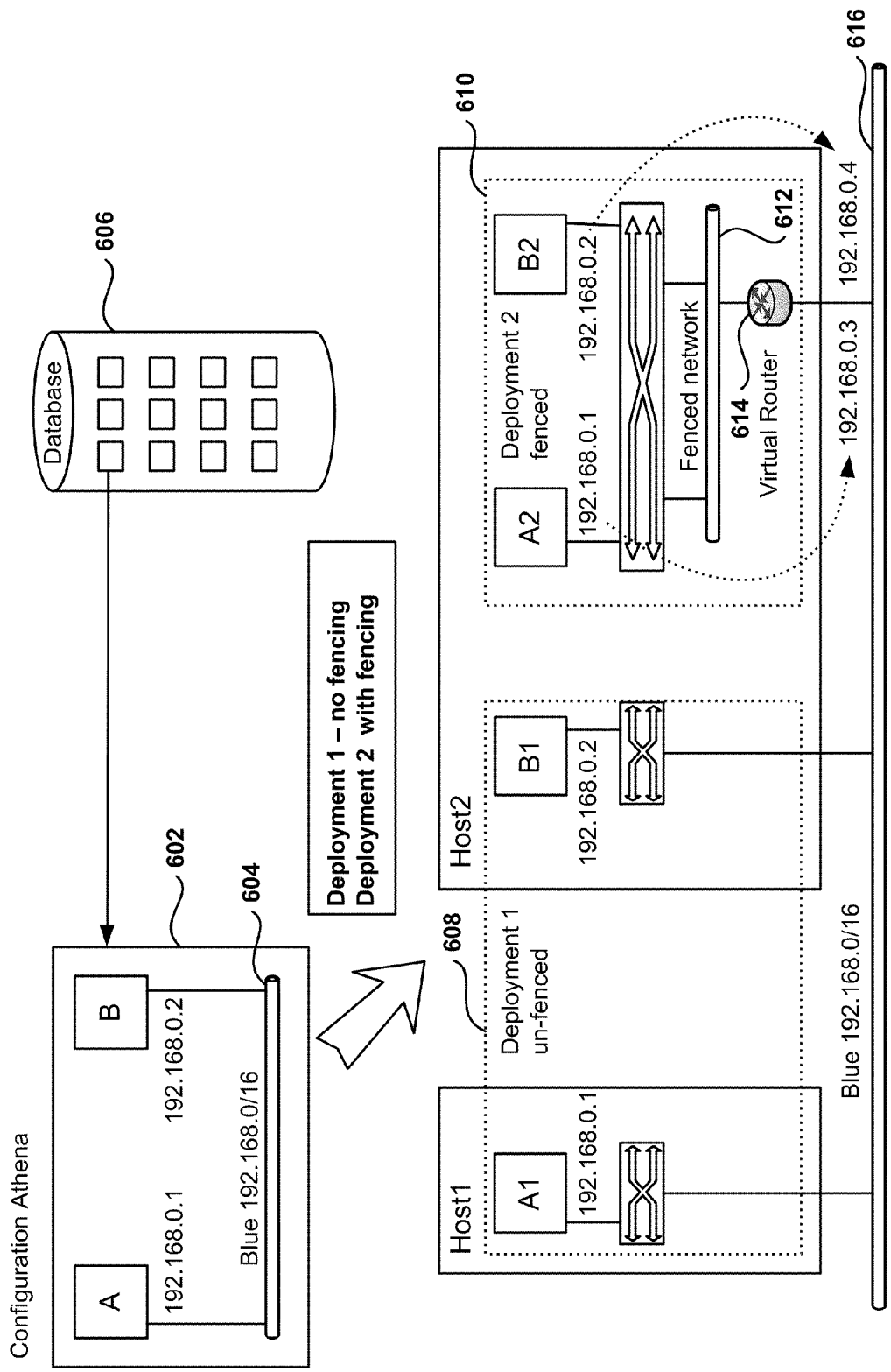
FIG. 6 illustrates the deployment of fenced networks in accordance with one or more embodiments.

FIG. 6 illustrates the deployment of fenced networks according to one embodiment. Virtual lab implements network fencing, an architecture that isolates or "fences" VM configurations while giving the VMs full network access. Fencing enables multiple deployments of the same configuration on the same physical network. For example, when concurrent development or testing on the same configuration is desired, the user can duplicate or clone the configuration. When a cloned configuration is created, virtual lab assigns the same network parameters to the cloned VMs and the VMs retain the same network configuration. If the original and cloned configurations are deployed at the same time, duplicate address errors can be avoided by deploying one of the configurations in fenced mode.

When VMs in a configuration have preconfigured IP addresses and the VMs are deployed in fenced mode, virtual lab assigns a unique external IP address to each of these VMs. Through these external addresses, VMs inside the fence and VMs outside the fence can communicate with each other. Virtual lab uses a VM called a virtual router to route packets between these VMs. The virtual router has at least two virtual NICs and "routes" traffic between the networks connected to the virtual NICs. In one embodiment, virtual lab configures the virtual router when a fenced configuration is deployed and deletes the virtual router when the configuration is undeployed.

Referring now to the fenced deployments shown in FIG. 6, configuration 602 named Athena has been cloned and deployed. Additionally, the cloned configuration has also been deployed, resulting in two deployments of configurations with the same elements. Configuration 602 includes VMs A and B, and network Blue 604 with subnet 192.168.0/16. In the configuration, VMs A and B have IP addresses of 192.168.0.1 and 192.168.0.2, respectively. The first deployment Deployment 1 608 has been deployed un-fenced, and the second deployment Deployment 2 610 has been deployed in fenced mode. Because Deployment 1 608 is unfenced, the resulting VMs A1 and B1 connect directly to shared network 192.168.0/16. It should be noted that to deploy configuration 602 in un-fenced mode, a shared network with the same network specification must exist so the VMs in the configuration can use the network addresses on the shared network.

Because Deployment 2 610 is fenced, fenced network 612 with exclusive access only to the VMs in Deployment 2 is created. VMs A2 and B2 in Deployment 2 610 have the addresses defined in the configuration, but these addresses are only used within fenced network 612. Virtual router 614 connects fenced network 612 with shared network Blue 616. Each of the "fenced" VMs A2 and B2 gets assigned an external IP address from Blue network 616, 192.168.0.3 and 192.168.0.4, respectively. Virtual router 614 performs address translation for packets travelling in or out of Deployment 2 610, thus translating 192.168.0.1 with 192.168.03 for VM A2, and 192.168.0.2 with 192.168.0.4 for VM B2.

Figure 7:
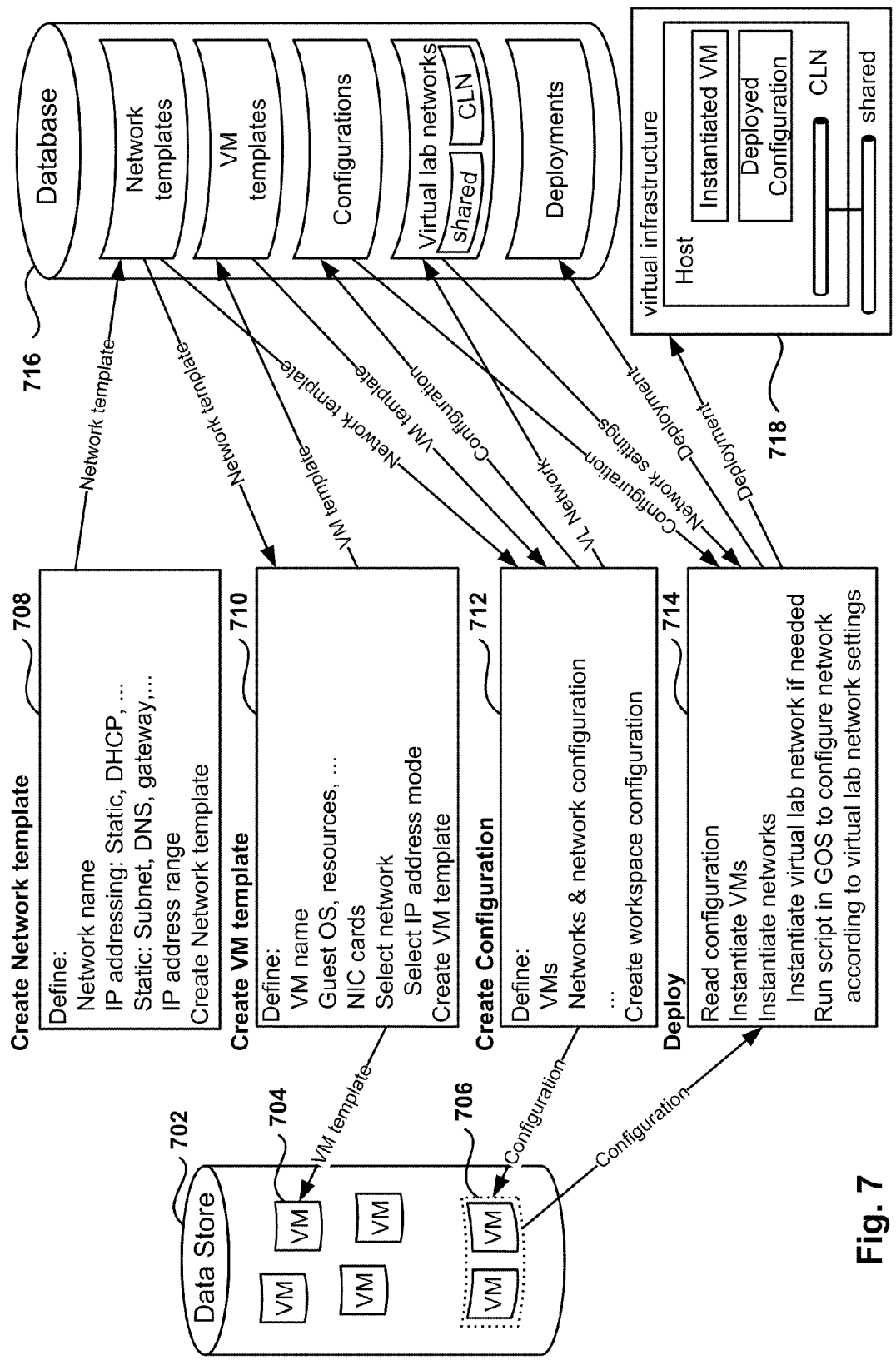
FIG. 7 illustrates the relationships among the different elements of the database and the processes related to these elements in accordance with one or more embodiments.

FIG. 7 illustrates the relationships among the different elements of the database and the processes related to these elements, in accordance with one embodiment. Virtual lab accesses and saves information in database 716 and in Data Store 702, which includes some of the data structures used by the program executing virtual lab. Information in Data Store 702 includes VMs 704 which can be associated with a Configuration 706. Information in Database 716 includes Network templates, VM templates, Configurations, Virtual lab networks (shared networks and CLNs), and Deployments.

Virtual lab uses a network abstraction to simplify the task of configuring networks in VMs. Each virtual lab network has a collection of network settings required for configuring VMs VNICs so that the VMs can connect and communicate with each other. The collection of network settings includes the network mask, default gateway, domain name server (DNS), IP addressing mode, IP address range, fencing policy, etc. Without the help of a virtual lab network, the user would have to enter these settings once for every VM network interface. To simplify the configuration of networks, the user specifies the network settings for a virtual lab network and then associates the network interface of a VM with a virtual lab network. Virtual lab can then automatically configure network interfaces for the deploying VM using the pertinent settings from the associated virtual lab network. This automatic configuration of networks reduces errors and saves time.

When a user requests an operation to create a network template 708, virtual lab collects the required information and then creates a network template which is stored in Database 716. Using network templates simplifies the process of adding multiple virtual networks to multiple configurations. As previously discussed, a network template is a specification of network settings, and a network template is different from a network in that the network template does not represent an actual network segment (i.e. network carrying traffic), but rather represents an abstraction of a network. The user can use a network template to quickly and easily create and add virtual lab networks, which would inherit a copy of the template's settings, in a configuration. Further, virtual lab can create physical and virtual networks based on a network specification and then create virtual networks based on the specification of a physical network, such that the virtual network and the physical network are identical in all respects.

When a user creates VM template 710 in virtual lab, the users specifies information such as name of the template, description, GOS, number of virtual Central Processing Units (CPU), memory, disk size, network, IP address mode, etc. In one embodiment, there are three choices for the IP address mode, static-IP pool, Dynamic Host Configuration Protocol (DHCP), and static manual. The static-IP pool mode allows virtual lab to assign static IP addresses to VNICs, where the static IP addresses are obtained from a pool of IP addresses managed by virtual lab. DHCP mode allows virtual machines to pull IP addresses from a DHCP server, and static-manual mode allows the virtual lab to configure the VNIC with a specific IP address. The use of static-IP pool mode allows the user to take advantage of static IP configurations while avoiding the appearance of simultaneous duplicate IP addresses in the virtual infrastructure because virtual lab assigns a different IP address to each VNIC, where the different IP addresses are obtained from a pool of IP addresses managed by the virtual lab.

VM network interfaces in a VM template can be associated with network templates. When a user specifies a VM in the VM template and a network associated with a network template in the VM, virtual lab ties the VM template to the associated network template. Further, virtual lab enables network matching by providing automatic matching of equivalent network settings between network templates and virtual lab networks. Network matching is based on the corresponding network settings and on how a network was created. This allows the automated configuration of a VM resulting in proper VM network connectivity.

Additionally, when a user adds a new VM based on a VM template to an existing configuration, virtual lab automatically connects the new VM's network interfaces to the matching private virtual lab networks that already exist in the configuration. Virtual lab allows the user to capture a VM by extracting the properties of the VM and creating a VM template based on the properties extracted from the VM. Virtual lab automatically converts the network interfaces of the captured VM to a matching network template, when a match exists. Furthermore, when a VM is cloned or moved from one configuration to another, virtual lab automatically connects the VM's NICs to a matching network in the destination configuration. The resulting VM template from Create VM template operation 710 is stored in database 716 or in Data Store 702.

Create configuration 712 operation allows the user to define the VMs and networks in the configuration, as previously discussed. The VMs and networks can be based on VM templates and on network templates, respectively. The resulting configuration and virtual lab networks are stored in Database 716 or Data Store 702.

During Deploy 714 operation, virtual lab reads the configuration, instantiates the VMs and the networks, and runs scripts in the GOS of the VMs to configure the VNICs according to the network settings of the corresponding virtual lab network. Virtual lab communicates with the virtual infrastructure and sends a request to instantiate the VMs and the networks. Instantiating a VM requires registering the VM in the virtual infrastructure and powering-on the registered VM. The networks are instantiated in the corresponding virtual infrastructure hosts if the networks do not already exist in the hosts. When deploying a configuration, virtual lab uses the settings from VM templates and network templates as needed.

Guest customization allows virtual lab to customize the network settings for a VM made from a VM template. Enabling guest customization on a VM template configures a script to run every time the VM starts up. This script reads the information regarding the VM and determines what actions to take. Virtual lab sets up customization actions in the script inside the VM while deploying configuration VMs. In one embodiment, when these VMs first start up, the VM customization script performs the relevant actions, including the configuration of VNICs. In another embodiment, when these VMs start up after VM settings have changed, the VM customization script also performs the relevant actions. Deploying a configuration results in a deployed configuration in virtual infrastructure 718, which includes the virtual lab hosts, the VMs, the deployed configurations, and the deployed CLN and shared networks.

Figure 8:
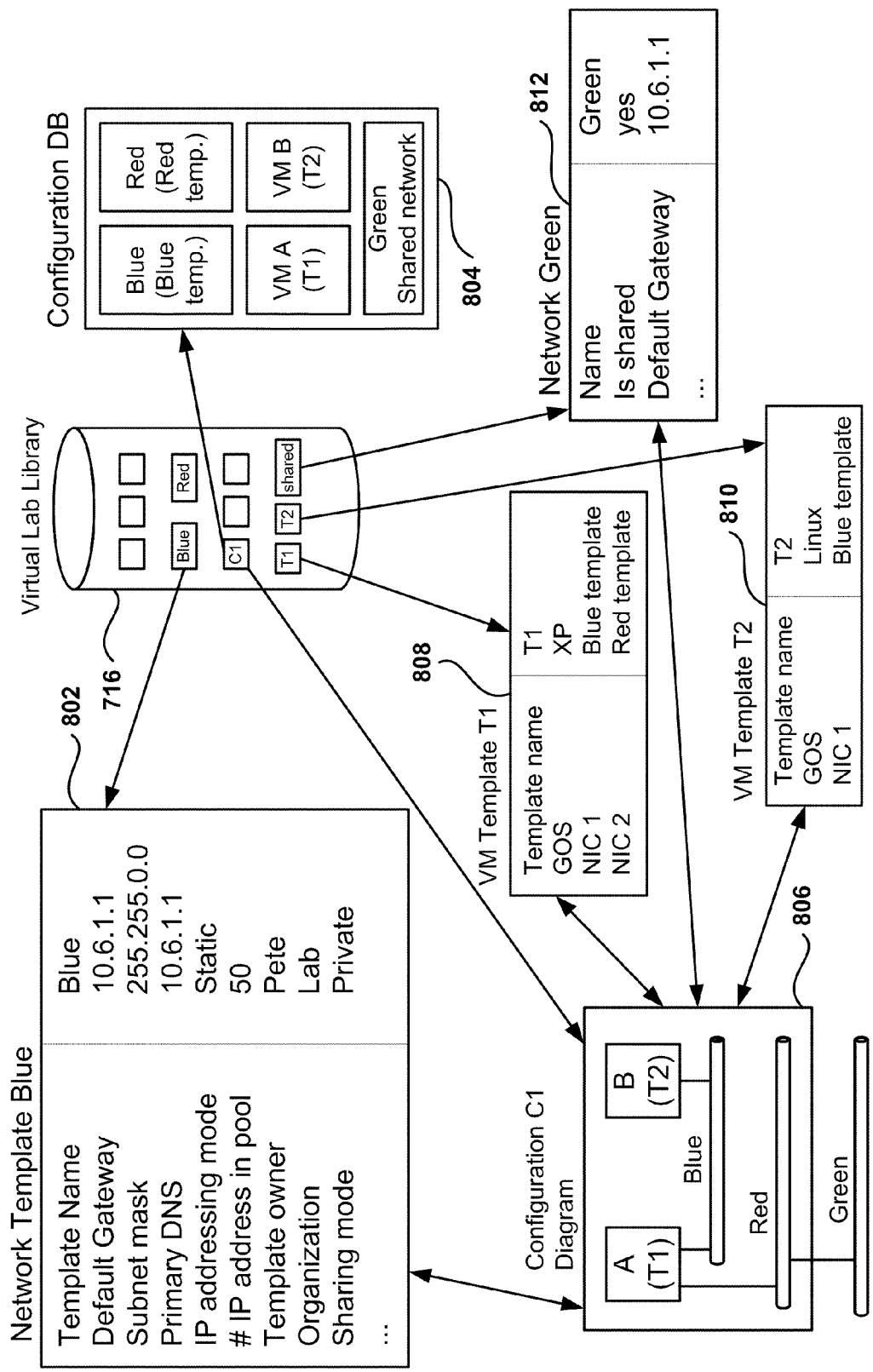
FIG. 8 illustrates the deployment of a configuration using VM templates and network templates in accordance with one or more embodiments.

FIG. 8 illustrates the deployment of a configuration using VM templates and network templates, according to one embodiment. Virtual lab library 716 includes information regarding configuration C1 804 and related data, such as network templates Blue 802 and Red, VM Templates T1 808 and T2 810, and shared Green network 812. Configuration C1 804 includes a Blue network based on Blue network template 802, a Red network based on a Red network template, VM A based on VM template T1 808, VM B based on VM template T2 810, and the Green shared network. Graphical representation of configuration C1 806 shows that VM A is connected to the Blue and Red Networks, VM B is connected to the Blue Network, and the Red network is connected to the shared network Green.

Network template 802 illustrates some of the parameters in the network template Blue, such as default gateway, subnet mask, primary DNS, etc. VM templates T1 808 and T2 810 include information regarding the VMs in configuration C1 806. Finally, the table associated with shared network Green 812 includes network settings for the shared network.

In one embodiment, configuration C1 is cloned to create an identical configuration C2. When both configurations C1 and C2 are deployed in the virtual infrastructure, the result is two deployed configurations with identical network specifications but that do not conflict with each other. In particular, deployed C1 and C2 network addresses do not conflict with each other because virtual lab tracks the use of IP addresses. When a VM in C1 or C2 is associated with a network address in a shared network, virtual lab configures the respective VMs with a different associated external network address. Virtual lab keeps track of the resources deployed, such as the network addresses used by the VMs. More details on the data structures used by virtual lab to manage the pool of resources are given below in reference to FIG. 11.

In another embodiment, C1 and C2 include a CLN each. When both configurations C1 and C2 are deployed, the CLNs in C1 and C2 have the same network specifications. During deployment, virtual lab enables the CLNs from C1 and C2 to be isolated and independent from each other. It is also possible that after copying C1 to C2, the CLN in C2 be modified, such that the CLNs in C1 and C2 are no longer identical, though they initially inherited properties from the same network template. In this scenario, virtual lab still guarantees that the CLNs are isolated and do not conflict with each other.

In yet another embodiment, configuration C1 is cloned and then modified to obtain configuration C3. When both configurations C1 and C3 are deployed in the virtual infrastructure virtual lab also guarantees the deployed C1 and C3 do not conflict with each other. Although C3 has been modified, part of configuration C3 is identical to a part of configuration C1, and virtual lab manages the identical settings as previously discussed with respect to cloned configurations. This is possible because virtual lab keeps track of the deployed VMs' IP addresses.

Figure 9:
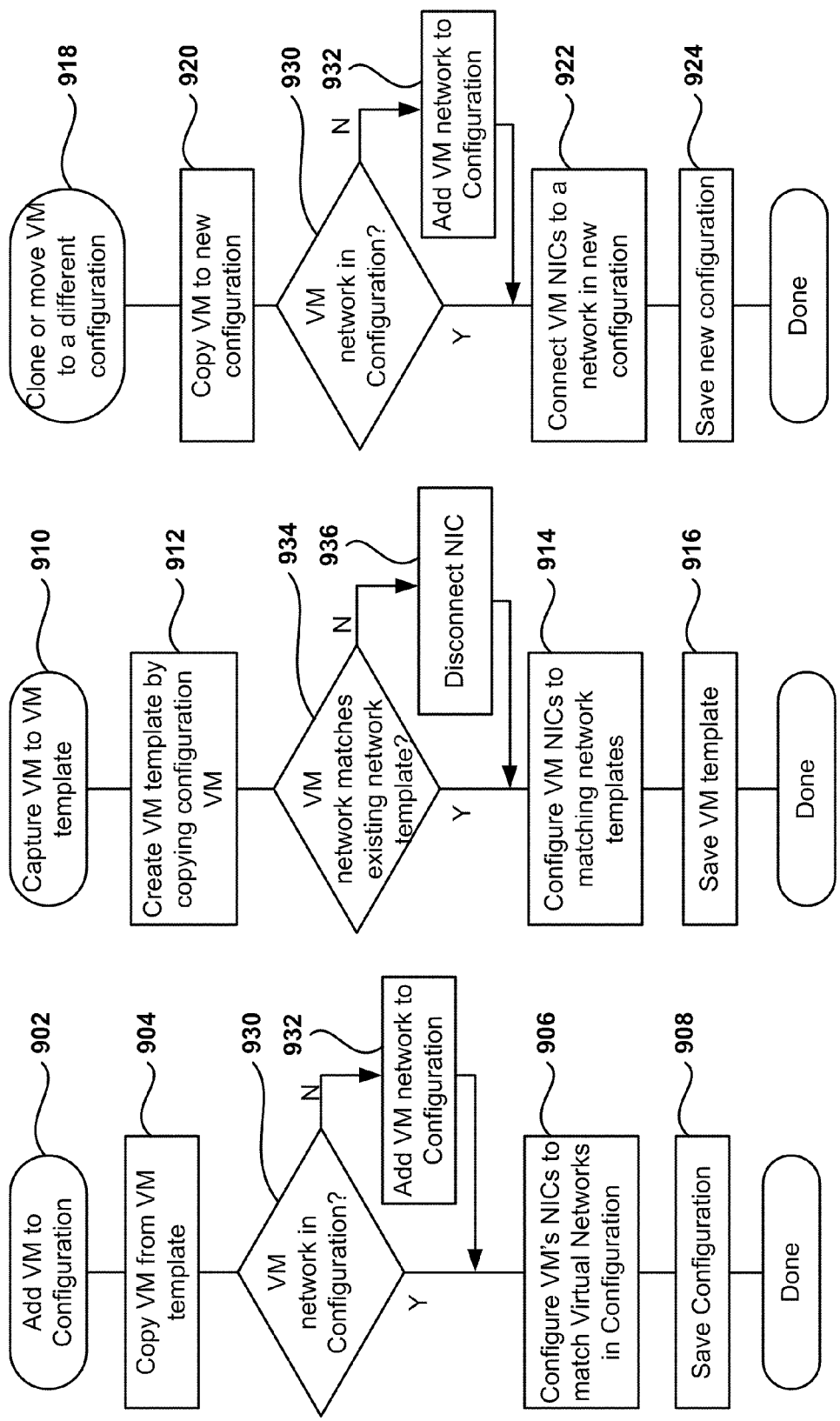
FIGS. 9A-C illustrate three embodiments for different methods to perform network matching.

FIGS. 9A-C illustrate three embodiments for different methods to perform network matching. Method 902 illustrates how to add a VM to a configuration based on a VM template for the VM. In operation 904, the method of FIG. 9A reads information about the VM from the VM template. As previously discussed, this information can include Guest OS, number of processors, number and configuration of VNICs, etc. After operation 904, the method flows to operation 930 to check if each network used by the VM exists in the configuration. If the result of the check is negative then the method flows to operation 932 where the network, or networks, in the VM not already in the configuration is added to the configuration. In operation 906, virtual lab configures the VM's VNICs to match the virtual networks existing in the configuration. The user has the option of manually configuring the VNICs. After the VM's VNICs have been configured, virtual lab saves the configuration in operation 908. As previously discussed in reference to FIG. 7, virtual lab can save the information in Database 716, or in Data Store 702, or in both Database 716 and Data Store 702.

Method 910 in FIG. 9B captures an existing VM in the virtual infrastructure to create a VM template. After a VM in a configuration undergoes changes, such as the addition of software or altered properties, a user can also use the altered VM to create a new VM template. The new VM template is a linked clone of the original VM. In operation 912, the VM template is created with the information from the existing VM in the infrastructure. In operation 934 a check is performed to determine if the VM network matches an existing network in the template. If the determination is negative, the method flows to operation 936 where the NIC is disconnected and to operation 914 otherwise. In operation 914, the VNICs in the VM are associated with the corresponding network templates that were used to configure the VNICs in the VM. Finally, the created VM template is saved in Database 716, or in Data Store 702, or in both Database 716 and Data Store 702.

Method 918 in FIG. 9C illustrates how to clone or move a VM from one configuration to another. A user can create a linked clone or a full clone of a VM template to take advantage of software already installed on that VM template. A linked-clone operation generates a "quick" copy by creating a delta disk instead of copying an entire virtual hard disk. This operation addresses data space usage by using referential provisioning, a process that involves storing new changes but refers back to a chain of delta changes. A full-clone operation copies all the delta disks and the base disk and consolidates them into a new base disk. Additionally, a user can move VMs from one configuration to another. A move operation removes the selected VMs from the source configuration and adds them to the destination configuration. In operation 920, the VM being cloned or moved is copied to the new configuration. After operation 920, the method flows to operation 930 to check if each network used by the VM exists in the configuration. If the result of the check is negative then the method flows to operation 932 where the network, or networks, in the VM not already in the configuration is added to the configuration. In operation 922 the VM VNICs are connected to a network in the configuration where the VM is being copied. After operation 922, the new configuration is saved in operation 924.

Figure 10:
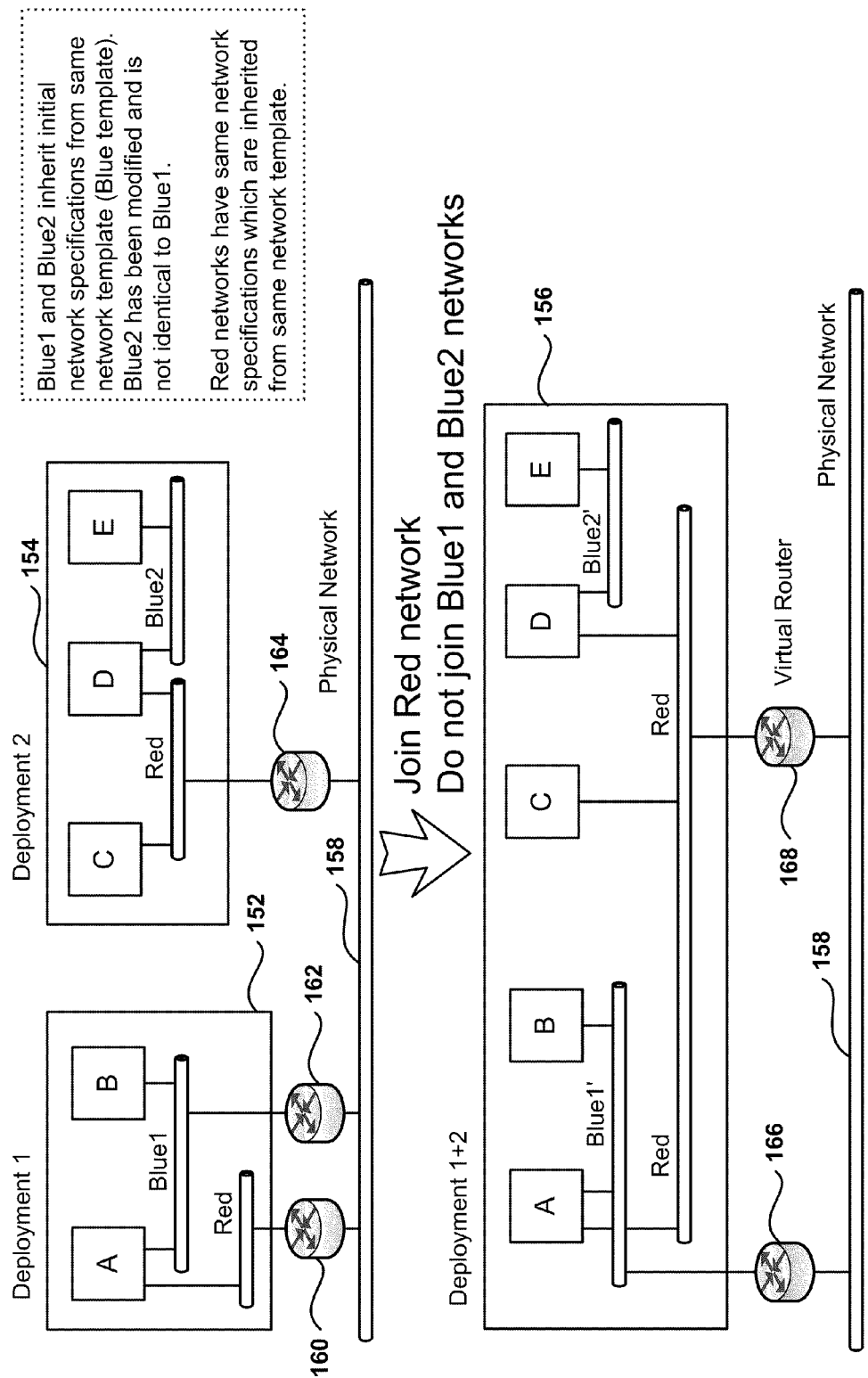
FIG. 10 illustrates an operation for joining two different deployments in accordance with one or more embodiments.

FIG. 10 illustrates an operation for joining two different deployments, according to one embodiment. Deployment 1 152 includes VMs A and B, and CLN networks Blue1 and Red. Both CLN networks are connected to shared network 158 via virtual routers 160 and 162, respectively. Deployment 2 154 includes VMs C, D, and E, and CLNs Red and Blue2. Red CLN is connected to shared network 158 via virtual router 164. Networks Blue1 and Blue 2 have inherited their initial network settings from the same Blue network template. However, Blue2 has been modified with respect to the original network template and no longer has the same network settings as Blue1. More specifically, Blue1 has external connectivity via virtual router 162, while Blue2 is a CLN isolated inside Deployment 2 154 with no external connectivity. On the other hand, both Red networks are derived from the same network template and have not been modified, thus both Red networks have identical network settings.

A user has requested to join both deployments into a new Deployment 1+2 156. The user has selected to join the Red networks and to leave isolated and separate Blue1 and Blue2 networks. Resulting Deployment 1+2 156 has VMs A and B connected to network Blue1' derived from network Blue1. Blue1' still has a virtual router 166 to provide external connectivity, as in Deployment 1 152. The other Blue-template related network is Blue2', which is derived from Blue2 in Deployment 2 154. As with the original Deployment, Blue2' is a CLN with connections only to VMs D and E. Virtual lab has maintained Blue1 and Blue2 separate, as requested by the user. On the other hand, the Red networks have been joined together with VMs A, C, and D connected to the Red network, which still has a virtual router to provide a route to shared network 158. It should be noted that only one virtual router is needed for the joined network, thus one of the two virtual routers 160 and 164 will be terminated.

Figure 11:
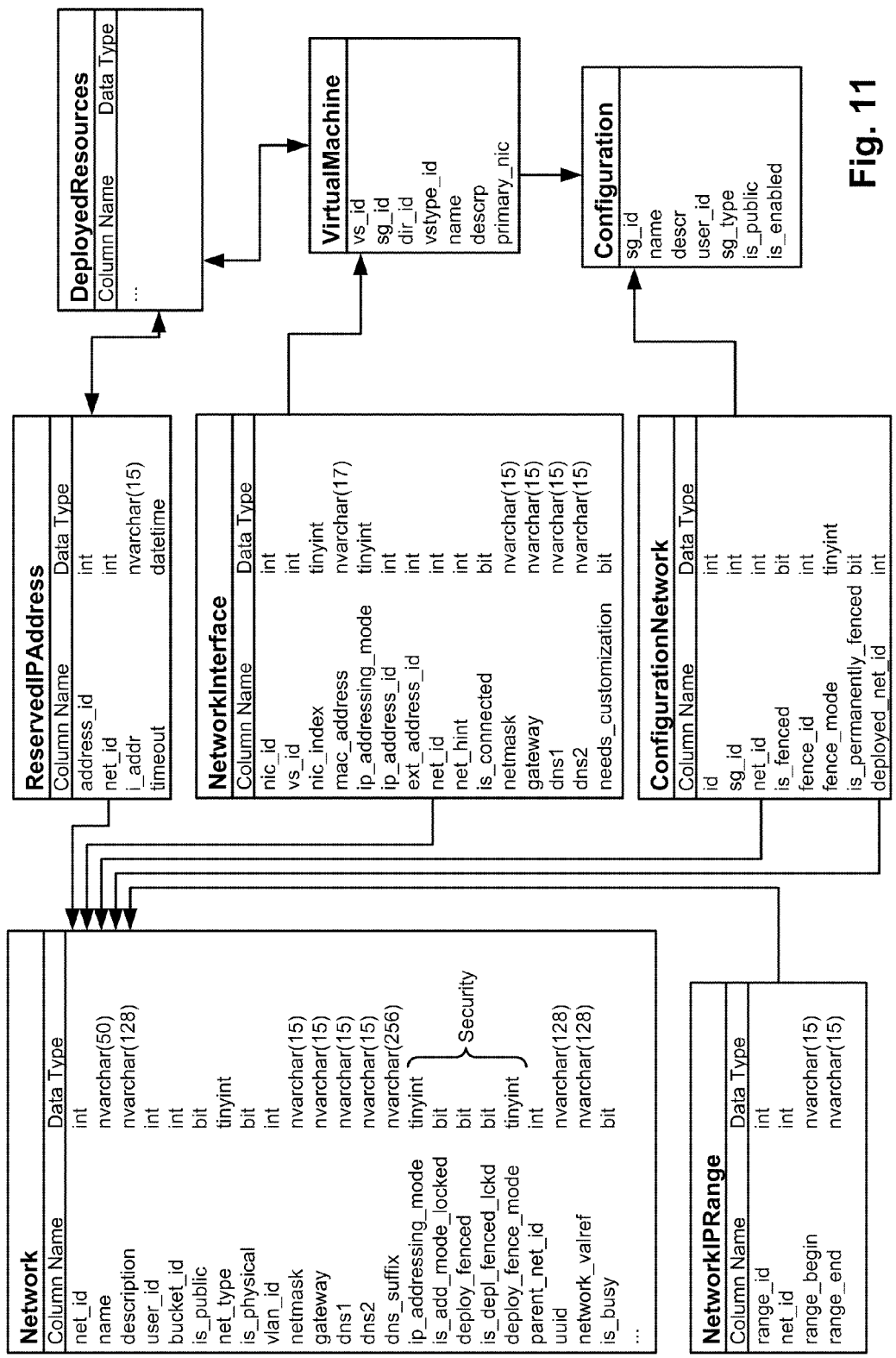
FIG. 11 shows data structures used by the virtual lab in accordance with one or more embodiments.

FIG. 11 shows data structures used by the virtual lab in accordance with one embodiment of the invention. The Network table is used for tracking the virtual lab networks created, which can be shared networks or CLNs. The Network table includes an identification for the network, the name of the network, a description, user id of the owner, flag indicating if the network is physical or CLN, a Virtual Local Area Network (VLAN) identifier, network mask, gateway, DNS, etc. The NetworkIPRange table is a network address range table defining a pool of available network addresses for the virtual lab networks in the network table. The NetworkIPRange table contains an identifier, a network identifier for the network associated with the range, beginning of the range for the pool of network addresses, end of the range for the pool of network address, etc. The ReservedIPAddress table is a reserved network addresses table defining the network addresses currently allocated to VMs. This table includes an identifier for the entry, a network identifier, network address, timeout for recycling the entry, etc. When virtual lab configures VMs with networks, virtual lab uses the NetworkIPRange and ReservedIPAddress tables to assign network addresses to VMs that are unique. In this fashion, virtual lab prevents the assignment of duplicate IP addresses to configuration VMs. When virtual lab instantiates VMs and networks, virtual lab uses DeployedResources and ReservedIPAddress tables to prevent the duplicate deployment of the same addresses.

The NetworkInterface table is a network interface table for tracking the connections from the VMs to the virtual lab networks, that is, NetworkInterface table holds information regarding the configuration of the VNICs in the VMs. Each VNIC corresponds to one entry in the table and includes a NIC identifier, VM identifier, MAC address, network addressing mode, network identifier, network mask, etc. The Configuration table is used for tracking deployed configurations of VMs and includes the configuration identifier, the name of the configuration, a description, the user identifier of the owner, etc. In addition, the VirtualMachine table is a VM table for tracking deployed VMs in the deployed configurations. The VM table includes an identifier for the deployed VM, identifier for the configuration of the VM (linked to the Configuration table), name of the VM, primary NIC, etc. Further, the ConfigurationNetwork table is a configuration network table for tracking deployed networks from the deployed configurations and includes an identifier for the entry, a configuration identifier (relating to the Configuration table), network identifier, fencing parameters, etc.

Virtual lab provides access to resource pools in the virtual infrastructure. The DeployedResources table is used to track the resources in use in the virtual infrastructure by the deployments of virtual lab. A resource pool is a logical structure that allows delegation of control over the resources of a host. VMs execute in, and draw their resources from, resource pools. It should be appreciated that the data structures illustrated in FIG. 11 are exemplary data structures for virtual lab. Other embodiments may utilize different fields, or may arrange the data in varying manners. The embodiments illustrated in FIG. 11 should therefore not be interpreted to be exclusive or limiting, but rather exemplary or illustrative.

Figure 12:
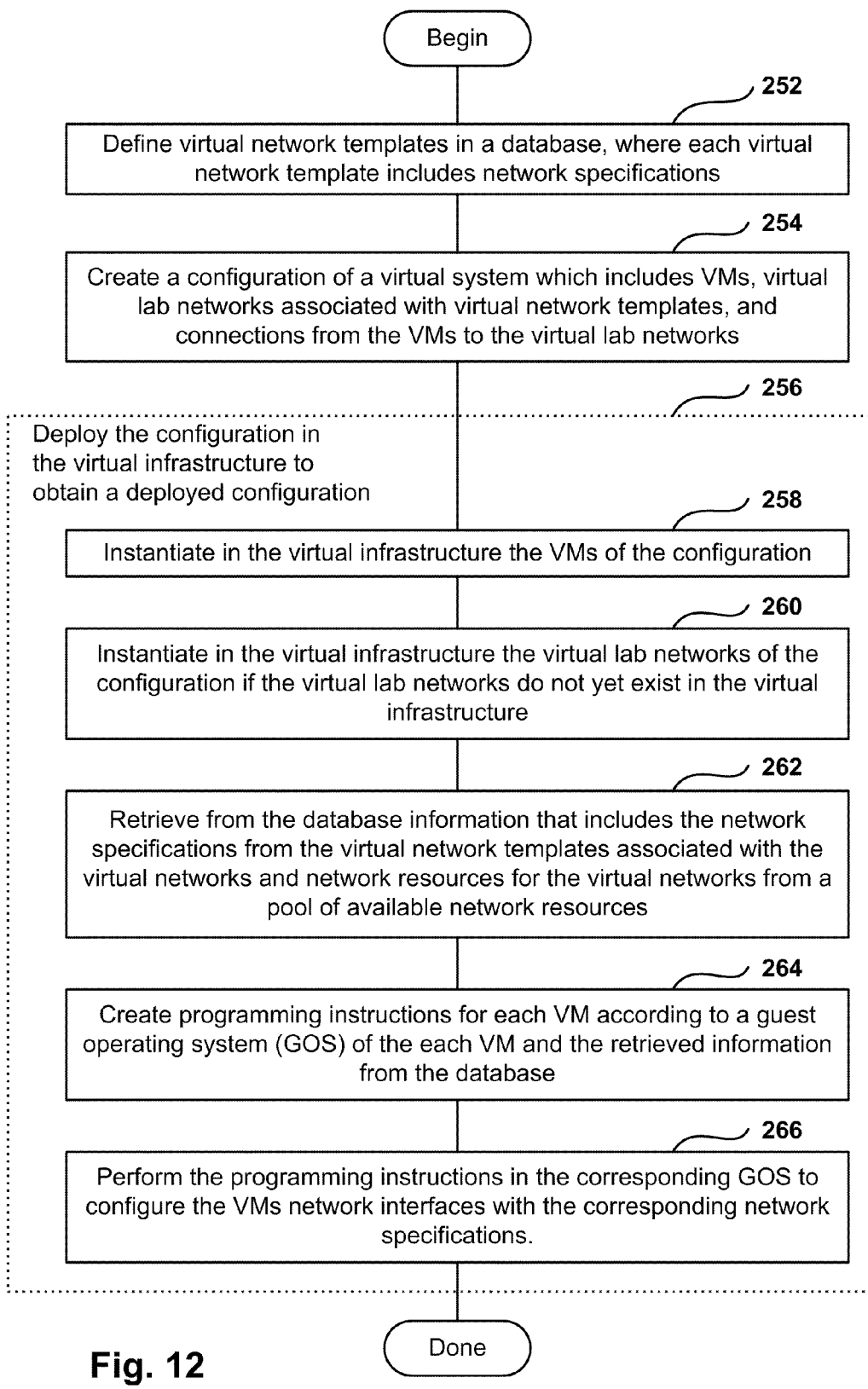
FIG. 12 shows the process flow for creating VMs and associated networks in a virtual infrastructure in accordance with one or more embodiments.

FIG. 12 shows the process flow for creating VMs and associated networks in a virtual infrastructure in accordance with one embodiment of the invention. In operation 252, the method defines virtual network templates in a database, where the network templates include network specifications, such as the subnet mask, gateway and DNS information, etc. See for example FIGS. 7 and 8 with information about network templates. After operation 252, the method flows to operation 254 where a configuration of a virtual system is created. The configuration includes VMs, virtual lab networks associated with virtual network templates, and connections from the VMs to the virtual lab networks. The virtual lab networks can be shared networks or CLNs, as previously discussed in reference to FIG. 1.

Following operation 254, the method instantiates VMs in the virtual infrastructure in operation 258. Further, the method instantiates the virtual lab networks of the configuration in operation 260, but only if the virtual networks do not yet exist in the virtual infrastructure. In operation 262, the method retrieves information from the database, such as the network specifications from the virtual network templates associated with the virtual lab networks and network resources for the virtual lab networks. The network resources are chosen from a pool of available network resources.

The method flows from operation 262 to operation 264 where programming instructions are created, such as a script, for each VM according to the GOS of the VM and to the information retrieved from the database. See for example FIG. 7 describing how information is stored and retrieved from the database. Further, in operation 264, the method performs the programming instructions in the corresponding GOS to configure the VMs network interfaces with the corresponding network specifications. In one embodiment, virtual lab sends the programming instructions to the virtual infrastructure to be executed in the corresponding VM. The method operations 259-266 together accomplish the deployment of the configuration in the virtual infrastructure to obtain a deployed configuration. See for example deployed configurations 608 and 610 in FIG. 6; 152, 154 and 156 in FIG. 10; etc.

Figure 13:
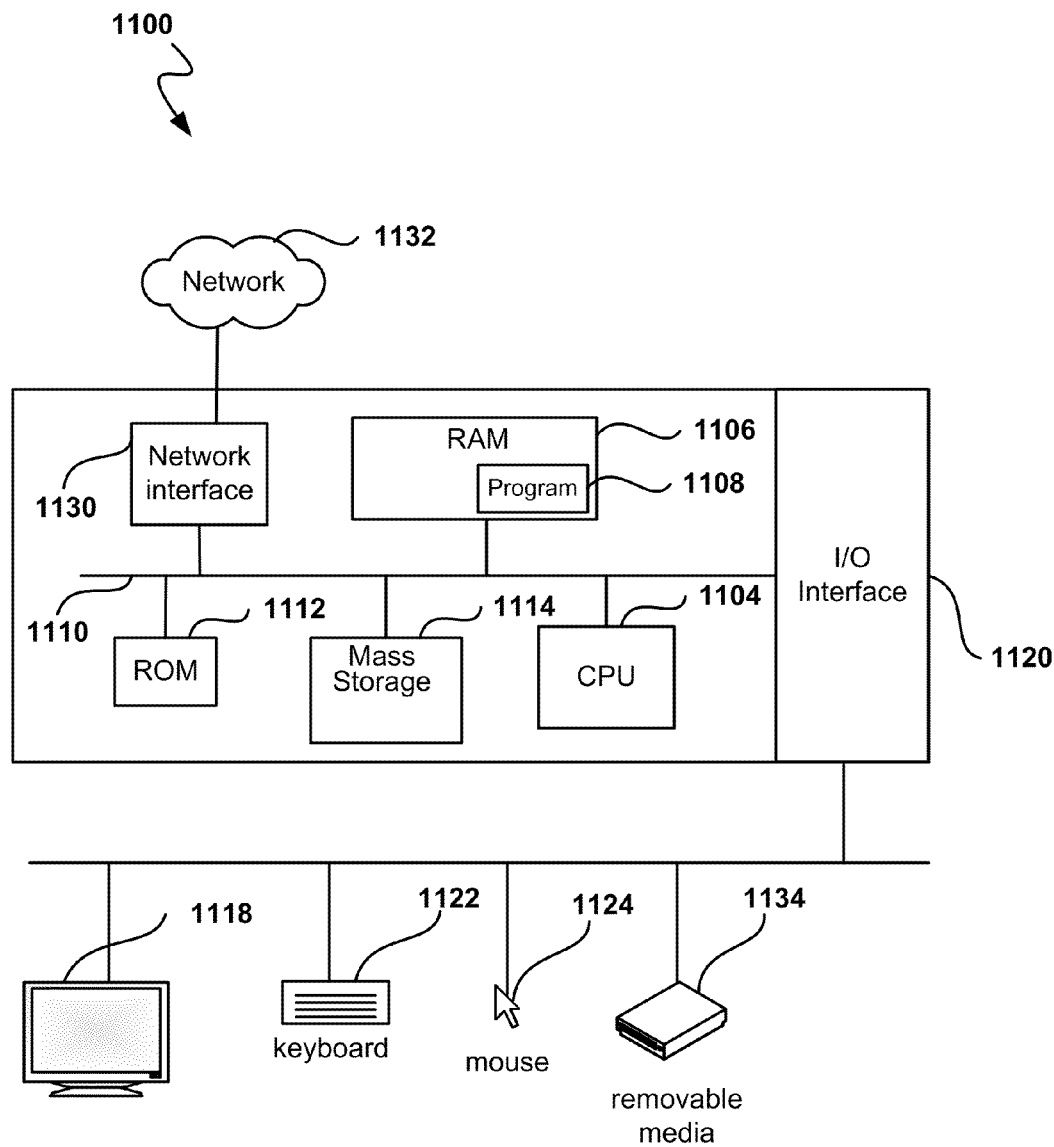
FIG. 13 is a simplified schematic diagram of a computer system for implementing embodiments of the present invention.

FIG. 13 is a simplified schematic diagram of a computer system for implementing embodiments of the present invention. It should be appreciated that embodiments of the invention described herein may be performed with a digital processing system, such as a conventional, general-purpose computer system. Special purpose computers, which are designed or programmed to perform only one function may be used in the alternative. As shown in FIG. 13, the computer system includes a central processing unit 1104, which is coupled through bus 1110 to random access memory (RAM) 1106, read-only memory (ROM) 1112, and mass storage device 1114. Program 1108 resides in RAM 1106, but can also reside in mass storage 1114. Program 1108 can include a virtual machine, a virtual router, and other programs used to implement embodiments of the invention. Mass storage device 1114 represents a persistent data storage device such as a floppy disc drive or a fixed disc drive, which may be local or remote. Network interface 1130 provides connections via network 1132, allowing communications with other devices. It should be appreciated that CPU 1104 may be embodied in a general-purpose processor, a special purpose processor, or a specially programmed logic device. Input/Output (I/O) interface provides communication with different peripherals and is connected with CPU 1104, RAM 1106, ROM 1112, and mass storage device 1114, through bus 1110. Sample peripherals include display 1118, keyboard 1122, cursor control 1124, removable media device 1134, etc.

Display 1118 is configured to display the user interfaces described herein. Keyboard 1122, cursor control 1124, removable media device 1134, and other peripherals are coupled to I/O interface 1120 in order to communicate information in command selections to CPU 1104. It should be appreciated that data to and from external devices may be communicated through I/O interface 1120.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for creating virtual machines (VM) and associated networks in a virtual infrastructure, the method comprising:
    storing a plurality of virtual network templates in a database, each virtual network template including network specifications which define a network comprising a plurality of VMs;
    creating a configuration of a virtual system which includes VMs, virtual lab networks associated with virtual network templates, and connections from the VMs to the virtual lab networks; and
    deploying the configuration in the virtual infrastructure to obtain a deployed configuration, the deploying including,
        instantiating in the virtual infrastructure the VMs of the configuration,
        instantiating in the virtual infrastructure the virtual lab networks of the configuration if the virtual networks do not yet exist in the virtual infrastructure,
        retrieving information from the database, the information including the network specifications from the virtual network templates associated with the virtual lab networks and network resources for the virtual lab networks from a pool of available network resources,
        creating programming instructions for each VM according to a guest operating system (GOS) of the each VM and the retrieved information from the database, and
        performing the programming instructions in the corresponding GOS to configure the VMs network interfaces with the corresponding network specifications.

2. The method as recited in claim 1, further including:
    cloning the configuration of the virtual system to create a cloned configuration;

deploying the cloned configuration in the virtual infrastructure to obtain a cloned deployed configuration, wherein each deployed configuration has identical network specifications and the deployed configurations do not conflict with each other.

3. The method as recited in claim 1, further including:
creating a VM template, the VM template including one or more network interfaces; and
associating each network interface of the VM template with one of the virtual lab networks, wherein a VM associated with the VM template is configured with the network specifications of the corresponding virtual lab network when the VM is instantiated during the deploying.

4. The method as recited in claim 1, wherein the network specifications are selected from a group consisting of a subnet mask, a gateway, a network address range, one or more Domain Name System (DNS) servers, available addressing modes, shared network or configuration local network (CLN) mode, or fencing mode.

5. The method as recited in claim 1, wherein each virtual lab network is one of a CLN or a shared network, wherein the CLN is isolated and available only to VMs in the deployed configuration, wherein the shared network is available to all deployed configurations.

6. The method as recited in claim 1, further including:
copying the configuration of the virtual system to create a copy configuration;
modifying the copy configuration; and
deploying the copy configuration to obtain a deployed copy configuration, wherein the deployed configuration and the deployed copy configuration coexist within the virtual infrastructure without conflicting with each other.

7. The method as recited in claim 1, further including:
capturing an existing VM in the virtual infrastructure to create a VM template;
reconfiguring network interfaces from the existing VM to a matching network template in the created VM template.

8. The method as recited in claim 1, further including:
deploying a second configuration of the virtual system to obtain a second deployed configuration, the configuration including a first CLN, the second configuration including a second CLN, wherein the first and the second CLNs have same network specifications, the first and the second CLNs being isolated and independent from each other after deploying the second configuration.

9. The method as recited in claim 8, further including:
joining the first CLN and the second CLN when the first CLN and the second CLN have same network specifications, the joining providing connectivity between VMs connected to the first CLN and the second CLN.

10. The method as recited in claim 1, further including:
copying a source VM from the configuration to a copy VM in a second configuration of the virtual system; and
reconfiguring the network interfaces in the copy VM with matching networks in the second configuration.

11. The method as recited in claim 10, further including:
deploying the second configuration to obtain a second deployed configuration; and
joining a virtual lab network from the VM in the deployed configuration with a virtual lab network from the VM in the second deployed configuration to provide connectivity between VMs of the deployed configurations, the joining being performed by the virtual infrastructure.

12. The method as recited in claim 1, further including:
deploying a second configuration of the virtual system to obtain a second deployed configuration, the configuration including a first CLN, the second configuration including a second CLN, wherein the network specifications of the second CLN are obtained by copying the network specifications of the first CLN and by modifying the copied network specifications, wherein the first and the second CLNs are isolated and independent from each other after deploying the second configuration.

13. The method as recited in claim 1, wherein instantiating the VM further includes:
registering the VM in the virtual infrastructure; and
powering on the registered VM.

14. The method as recited in claim 1, wherein the configuration of the virtual system further includes:
virtual network interface cards (VNIC) for the VMs, wherein the connections from the VMs to the virtual lab networks are associated with a corresponding VNIC.

15. A system for creating virtual machines (VM) and associated networks in a virtual infrastructure, the system comprising:
a database for storing virtual network templates, configurations of virtual systems, virtual lab networks created, and a pool of available network resources for each of the virtual lab networks created, wherein each virtual network template includes network specifications which define a network of a plurality of VMs, wherein each configuration includes VMs, virtual lab networks associated with virtual network templates, and connections from the VMs to the virtual lab networks; and
an application module for deploying a configuration to obtain a deployed configuration, the deploying including,
instantiating in the virtual infrastructure the VMs of the configuration,
instantiating in the virtual infrastructure the virtual lab networks of the configuration if the virtual lab networks do not yet exist in the virtual infrastructure,
retrieving information from the database, the information including the network specifications from the virtual network templates associated with the virtual lab networks and network resources for the virtual lab networks from the pool of available network resources,
creating programming instructions for each VM of the configuration according to a guest operating system (GOS) of the each VM and the retrieved information from the database, and
transmitting the programming instructions for execution in the GOS of corresponding VMs to configure the VMs network interfaces.

16. The system as recited in claim 15, wherein the application module communicates via an application programming interface (API) with a virtual infrastructure server to request the instantiation of the VMs and the virtual lab networks.

17. The system as recited in claim 15, wherein data structures in the database include:
a network table for tracking the virtual lab networks created, the virtual lab networks being one of a shared network or a CLN;
a network address range table defining a range of network addresses for the virtual lab networks in the network table; and
a reserved network addresses table defining network addresses currently allocated to VMs.

18. The system as recited in claim 17, wherein the application module accesses the reserved network addresses table to avoid creating VMs with duplicate network addresses when deploying the VMs.

19. The system as recited in claim 17, wherein the data structures further include:
- a configuration table for tracking deployed configurations of virtual systems;
- a virtual machine table for tracking deployed VMs in the deployed configurations;
- a configuration network table for tracking deployed networks from the deployed configurations; and
- a network interface table for tracking the connections from the VMs to the virtual lab networks.

20. A computer program embedded in a non-transitory computer-readable storage medium, when executed by one or more processors, for creating virtual machines (VM) and associated networks in a virtual infrastructure, the computer program comprising:
- program instructions for defining virtual network templates in a database, each virtual lab network template including network specifications which define a network comprising a plurality of VMs;
- program instructions for creating a configuration of a virtual system which includes VMs, virtual lab networks associated with virtual network templates, and connections from the VMs to the virtual lab networks; and
- program instructions for deploying the configuration in the virtual infrastructure to obtain a deployed configuration, the deploying including,
    - instantiating in the virtual infrastructure the VMs of the configuration,
    - instantiating in the virtual infrastructure the virtual lab networks of the configuration if the virtual lab networks do not yet exist in the virtual infrastructure,
    - retrieving information from the database, the information including the network specifications from the virtual network templates associated with the virtual lab networks and network resources for the virtual lab networks from a pool of available network resources,
    - creating programming instructions for each VM according to a guest operating system (GOS) of the each VM and the retrieved information from the database, and
    - performing the programming instructions in the corresponding GOS to configure the VMs network interfaces with the corresponding network specifications.

21. The computer program as recited in claim 20, wherein each virtual lab network is one of a CLN or a shared network, wherein the CLN is isolated and available only to VMs in the deployed configuration, wherein the shared network is available to all deployed configurations.

22. The computer program as recited in claim 20, further including:
- program instructions for creating a VM template, the VM template including one or more network interfaces; and
- program instructions for associating each network interface of the VM template with one of the virtual lab networks, wherein a VM associated with the VM template is configured with the network specifications of the corresponding virtual lab network when the VM is instantiated during the deploying.

23. The computer program as recited in claim 20, further including:
- program instructions for cloning the configuration of the virtual system to create a clone configuration; and
- program instructions for deploying the clone configuration in the virtual infrastructure to obtain a clone deployed configuration, wherein each deployed configuration has identical network specifications and the deployed configurations do not conflict with each other.

* * * * *